No. 708,484. Patented Sept. 2, 1902.
E. KEMPSHALL.
PLAYING BALL.
(Application filed June 16, 1902.)

(No Model.)

Witnesses:

Inventor:
Eleazer Kempshall
By his Attorney
F. H. Richards.

UNITED STATES PATENT OFFICE.

ELEAZER KEMPSHALL, OF BOSTON, MASSACHUSETTS.

PLAYING-BALL.

SPECIFICATION forming part of Letters Patent No. 708,484, dated September 2, 1902.

Application filed June 16, 1902. Serial No. 111,829. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to balls such as used in golf and other games; and its object is to produce at low expense balls having a high degree of efficiency and durability.

Figure 1:
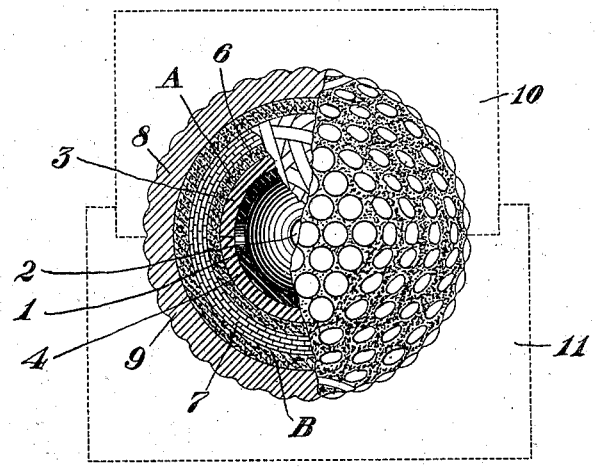
Figure 2:
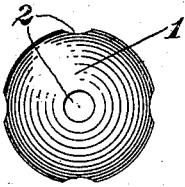
Figure 3:
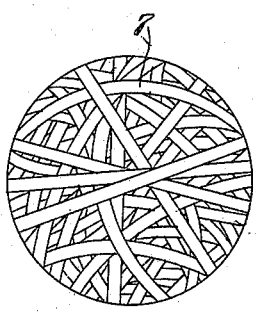

In the drawings forming part of this specification, Figure 1 is a view, partly broken away, of a ball made in accordance with my present improvements and illustrating by dotted lines the dies used in forming the shell upon the ball. Fig. 2 shows the center piece of the ball, and Fig. 3 illustrates a stage in its construction.

For the center piece I preferably employ a hard-rubber shell 1, which in practice I find has a high degree of resiliency, and this shell is preferably provided with perforations 2. Upon the shell are placed segments of soft rubber 3 and 4, which are cemented to the shell and also cemented at their edges. The sphere thus formed is bound tightly by miscellaneous windings of thread 6, which may consist of rubber, but are preferably linen cord or twine, so as to place said sphere under compression and render it not easily depressible. The windings of twine may, if desired, be impregnated with a celluloid solution, as indicated at A, thus producing a stiff casing upon the rubber sphere. Upon this casing is wound soft rubber under tension, preferably in the form of strips 7, and upon said windings of rubber are more tensioned windings of twine, although in some cases soft wire (preferably copper or iron) may be used. To the ball thus formed is applied a coating of celluloid solution, the outer windings of twine impregnated with celluloid being indicated at B. This ball is then inclosed in hemispherical segments 8 and 9 of celluloid or gutta-percha, preferably the latter, and by means of heating-dies 10 and 11 these half-shells are welded together and the entire filling is placed under compression and the celluloid at A and B is also compacted.

It will be observed that the soft-rubber layer 3 4 forms a mobile resilient shell, which is tightly bound by windings of substantially non-extensible twine 6. By these windings the rubber is put into a compressed condition, which renders it more powerful under a hard blow from a club, while a sphere made up of rubber thread or twine combined in this manner is less sensitive to a light blow than an uncompressed soft-rubber sphere would be. It will be understood, however, that the rubber layer in this instance should not be too thick, as it would require an undue body of cord wound thereon in order to put a thick rubber sphere into the requisite compressed condition. I therefore use a comparatively thin layer of rubber 3 4 upon the hard central shell 1, while over the binding-twine 6 I place another layer of soft rubber 7, to which I apply binding-cord B in a similar manner, thereby putting under compression said rubber sphere 7, as well as further compressing the inner rubber sphere 3 4. It will be understood that by alternating layers of rubber with layers of tight windings of substantially non-extensible material a ball of excellent flying and putting properties is produced. The three relatively unyielding layers (designated as 1, 6, and B) separated by layers of soft rubber form a ball having excellent action, said relatively unyielding layers preventing too great distortion of any portion of the ball under a hard blow, while the successive rubber layers furnish the requisite mobility and resiliency to secure proper action of the ball.

Variations may be resorted to within the scope of my improvements.

Having described my invention, I claim—

1. A playing-ball comprising a hard core, a layer of soft rubber thereon, twine wound tightly upon said soft rubber, a layer of rubber upon said twine, windings of twine upon the last-mentioned layer of rubber, and a shell of plastic material.

2. A playing-ball comprising a hard-rubber shell, a layer of soft rubber thereon, tense windings of twine upon said soft rubber, tense windings of rubber upon said twine, tense windings of twine upon said rubber windings, and a gutta-percha shell.

3. A playing-ball comprising a perforated hard-rubber shell, a layer of soft rubber thereon, tense windings of twine upon said soft rubber, tense windings of rubber upon said twine, tense windings of twine upon said rubber windings and a gutta-percha shell, said windings of twine being impregnated with celluloid.

4. A playing-ball comprising a hard shell, a plurality of rubber layers thereon, each layer being wound with twine, and a shell of gutta-percha.

5. A playing-ball comprising a perforated hard-rubber shell, a plurality of rubber layers thereon, each layer being wound with twine; and a shell of gutta-percha.

6. A playing-ball comprising a perforated center piece of hard material, a plurality of rubber layers thereon, each layer being wound with twine; and a shell of gutta-percha.

ELEAZER KEMPSHALL.

Witnesses:
 B. C. STICKNEY,
 JOHN O. SEIFERT.